United States Patent [19]
Kolic

[11] 3,861,641
[45] Jan. 21, 1975

[54] METERING HOSE CLAMP

[76] Inventor: Edwin S. Kolic, 544 Knights Ave., Gahanna, Ohio 43230

[22] Filed: June 1, 1973

[21] Appl. No.: 365,964

[52] U.S. Cl. ................. 251/9, 24/134 R, 24/136 R
[51] Int. Cl. ............................................. F16k 7/06
[58] Field of Search .... 251/6, 9; 24/134 R, 134 EA, 24/134 P, 257 A, 136 R; 339/274

[56] References Cited
UNITED STATES PATENTS

| | | | |
|---|---|---|---|
| 350,980 | 10/1886 | Jurick | 24/136 R |
| 2,063,696 | 12/1936 | Oxley | 251/9 X |
| 2,804,092 | 8/1957 | Aitchison | 251/9 X |
| 3,135,259 | 6/1964 | Evans | 251/6 X |
| 3,330,526 | 7/1967 | Berney | 251/9 |
| 3,354,518 | 11/1967 | Hoover | 24/134 |

Primary Examiner—Martin P. Schwadron
Assistant Examiner—Richard Gerard
Attorney, Agent, or Firm—Sandoe, Hopgood & Calimafde

[57] ABSTRACT

The invention contemplates a hose clamp comprising an elongate channel frame with opposed upstanding side walls from which a compression drum is pivotally suspended. The drum has two arcuate hose-compression surfaces on offset axes. For the compression surface of larger radius, the pivot axis is substantially diametrically opposed to the circumferentially central region of said larger-radius surface; and for the compression surface of smaller radius, the pivot axis is close to the axis of said smaller-radius surface. An integral handle extends in a direction generally transverse to the plane of compression-surface axes. The pivot support provided by the channel walls is such that, in one direction of lowering the handle toward the channel bottom, an inserted flexible hose may be clamped shut, and for the other direction of lowering the handle toward the channel bottom, a fine degree of metering control is achieved for flow in the hose.

19 Claims, 4 Drawing Figures

PATENTED JAN 21 1975　　3,861,641
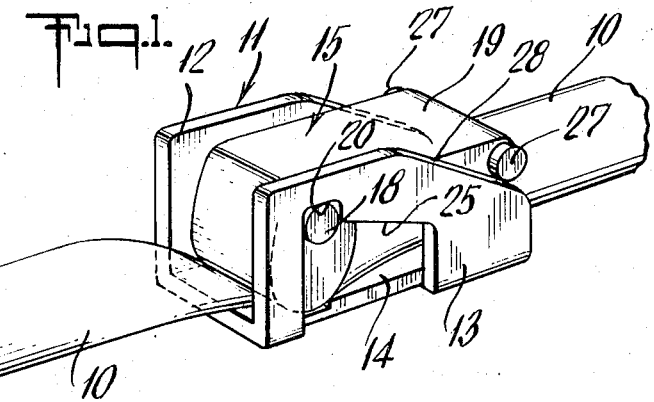
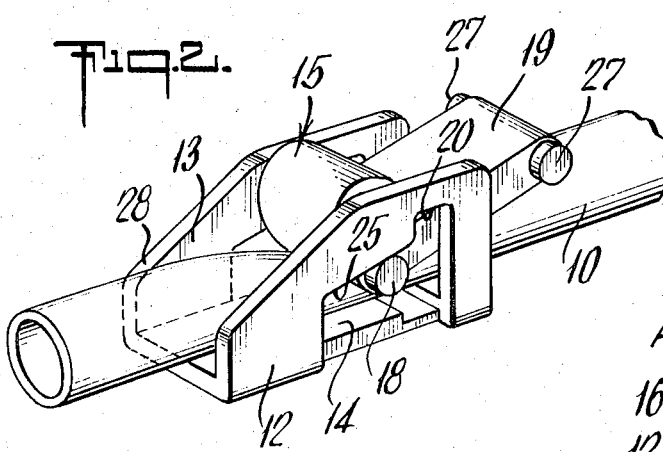
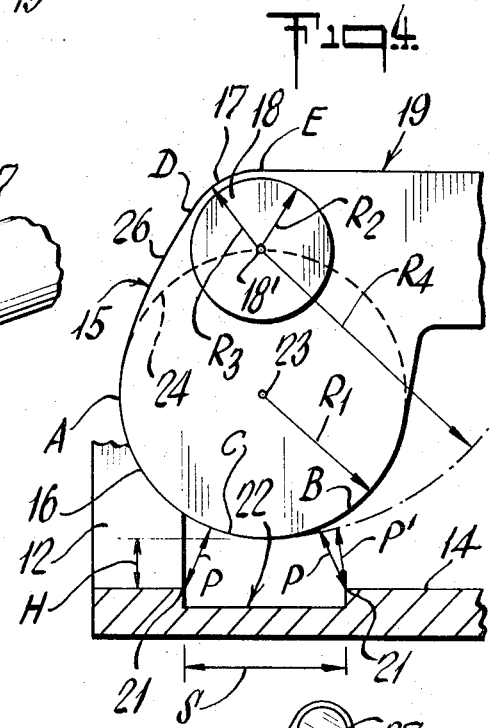
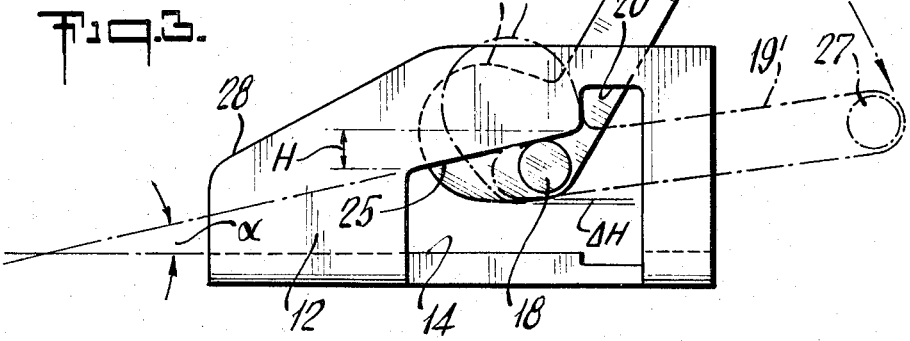

METERING HOSE CLAMP

The invention relates to a portable hose-clamp construction, particularly of the manually operable variety, lending itself for selective throttling and closure of elastomeric tubing, as in laboratory and hospital applications.

It is an object to provide an improved clamp device of the character indicated.

Another object is to provide such a clamp which is inherently self-locking in closed position and yet which is smooth-throttling in action, in approach to and away from the closed position.

A further object is to provide such a construction wherein a given throttling condition may be selected and wherein fine adjustment of throttling degree may be achieved with respect to the selected condition.

A general object is to provide a construction meeting the above objects with basic simplicity, enhanced ease of control and reliability, and low cost.

Other objects and various further features of the invention will be pointed out or will occur to those skilled in the art from a reading of the following specification in conjunction with the accompanying drawings. In said drawings, which show, for illustrative purposes only, preferred forms of the invention:

FIGS. 1 and 2 are perspective views of a hose to which a metering clamp of the invention has been applied, the figures respectively showing fully clamped and metering uses of the clamp;

FIG. 3 is a side-elevation view of the clamp to show different relationships for the metering operation; and FIG. 4 is an enlarged simplified diagram to enable identification of proportional relationships for the clamp, the same being shown for the clamped shut position.

Referring to the drawings, the invention is shown in application to a two-piece clamp for selectively adjustable compressional closure of an elastomeric hose or tube 10 which may be one of a variety of standard relatively soft hoses, as for example, pure-gun tubing, latex tubing, polyvinylchloride tubing, neoprene and butyl-rubber tubing, silicon tubing, etc. A frame member 11 comprises an elongate channel with opposed upstanding side walls 12–13, and a bottom wall 14 therebetween; member 11 is preferably a single-piece of suitable molded plastic, such as polypropylene. The other or compression-drum member 15 may be of similar molded-plastic integral construction; member 15 comprises first and second arcuate generally cylindrical compression surfaces 16–17, pivot means 18, and an actuating handle 19. The arcuate compression surfaces 16–17 are of different radius, and their respective axes are parallel and offset; the pivot means 18 are cylindrical projections at the respective ends of the drum, the axis 18' of pivot means 18 being close to and preferably coincident with the axis of the smaller-radius compression surface 17. As shown, the radius $R_1$ of the larger-radius compression surface 16 is about twice those ($R_2$, $R_3$) of pivot means 18 and of the smaller-radius compression surface 17. A large opening in each side wall 12–13 includes a notch 20 conforming to and for supporting the pivot elements 18 near one end of the frame member 11. For convenience, the bottom wall 14 extends or projects beyond the region of drum suspension, to provide extended aligning support for tube 10.

Consistent with the disclosure of my copending application Ser. No. 267,463, filed June 29, 1972, and now U.S. Pat. No. 3,813,077, the larger-radius compression surface 16 is caused to act on hose 10 at a part of bottom wall 14 where two spaced corner edges are presented to the underside of the hose 10 in the region of drum compression. Such relationship is illustrated in FIGS. 1 and 4, where these edges are shown as adjacent corners 21 of a rectangular opening or recess 22 in the bottom wall 14 directly beneath the axis of pivot means 18. Preferably, the corner edges 21 extend the full transverse extent of the channel bottom 14 and are spaced to the extent of a longitudinal span S which is symmetrically astride a plane normal to bottom 14 and through the transverse axis of pivot means 18. The compression-drum surface 16 is preferably of generally circular arcuate contour, of radius $R_1$ about an axis 23; as seen in FIG. 4, this surface 16 extends preferably at least approximately $3(\pi/4)$ radians, from a point A of substantial relief from throttling, to a point B past the region of maximum possible drum contact with tube 10. Preferably, the pivot axis at 18' is substantially diametrically opposed to the circumferentially central region C of surface 16 (i.e., between points A and B); thus, pivot means 18 is shown to be substantially on the $R_1$ circle which determines surface 16, so that pivot action establishes an orbit of radius $R_4$ for the point C of greatest offset from the pivot axis, and this radius $R_4$ is substantially twice the radius $R_1$ of drum surface 16. At the same time, arm 19 connects substantially in line with pivot means 18 and generally transverse to the plane of axes 18'–23, being preferably tangent to the $R_1$ circle, as will be clear from observing the phantom indication 24 thereof.

With the described structure, the region C is positioned between like pinch throats P, defined between the respective corner edges 21 and adjacent regions of surface 16. The magnitude of these throats will necessarily depend upon the wall thickness of tube 10; generally, it is at least no more than substantially twice the tube-wall thickness, being approximately 40 percent of the drum radius $R_1$ for a smooth-acting configuration. And for the heaviest tubing made, i.e., thick wall tubing, the minimum drum clearance at the bottom wall throat should be at least no greater than substantially 60 percent of the drum radius $R_1$.

Thus far, the general structure and operation are as disclosed in said copending application. And the operation is primarily on-off, for a range of handle positions on one side of the vertical through the pivot-support notch 20. For intermediate positions, there is a degree of metering action, achieved by finger retention of a given desired angular position of handle 19. Much greater control of metering is, however, achievable through further means of the invention, and for positions of handle 19 on the other side of the vertical, as will be explained particularly in connection with FIGS. 2 and 3.

In accordance with a feature of the invention, the side walls 12–13 have corresponding ramp formations 25 for selective engagement with pivot means 18, to achieve finely controlled flow metering in tube 10. As shown, these ramp formations 25 each define the upper sloping edge of an enlarged opening, wherein the notch 20 is at the end of greatest offset from the frame bottom 14, and each ramp 25 slopes downwardly at a relatively small angle α with respect to the flat surface of bottom 14. The angle α is in the order of 10°, being preferably substantially 7°, and the effective rise H between ends of each ramp 25 is preferably at least a substantial fraction of the diameter of pivot means 18.

To use the clamp for controlled metering, and starting for example from the clamped-shut condition of FIG. 1, the arm 19 is raised all the way, past the vertical, so as to be foldable down the other side of the vertical, as in FIG. 2. The handle 19 and its compression end are then pushed downwardly to an extent sufficient to dislodge pivot retention at notch 20; whereupon, handle 19 is pushed longitudinally to place each pivot element 18 on its ramp 25. With handle 19 raised about half way (45° from the bottom 14), the drum member 15 is pushed down ramps 25 to a point where tube 10 is compressed enough to achieve approximately the desired flow. At this point, it will be appreciated that the compliant deformation of tube 10 will have established a resilient loading of pivot elements 18 on their respective ramps, with the lesser-radius compression surface 17 in direct engagement with tube 10. Thereafter, rotation of arm 19 will cause the cylindrical pivot surfaces to walk up or down ramp 25, depending upon the direction of arm rotation. For example, for the approximately one-radian swing of arm 19 from the solid-line position (tube 10 contact being centered at location D of compression surface 17) to the phantom-line position 19' thereof shown in FIG. 3 (where tube contact involves location E of compression surfaces 17), an incremental adjustment ΔH is achieved in the offset of compression surface 17 from bottom 14. Thus, any selected angular position of arm 19 between these positions will achieve a proportionally lesser compressional displacement, within the range ΔH, and the point with respect to which the ΔH adjustment is available is chosen by the initial selection of longitudinal position for pivot action on ramps 25. The ramp slope α is sufficiently gentle to permit a no-slip rolling contact at 18–25, and the friction of parts engagement to tube 10 is sufficient to retain a metering adjustment, thus freeing the hands for other work.

It will be seen that the described invention meets all stated objects, that the structure is the essence of simplicity and ease of operating control, that a wide range of flow control is available, and that extremely fine adjustment of flow control can be made and retained. At the same time, full cut-off of flow can, if desired, also be achieved, and with a double-pinch action (at throats P), which has been found effective against hydraulic pressures as great as 50 psi; in metering use of the clamp, as in FIG. 3 relation with pivots 18 near the lower end of ramps 25, full cut-off of flow can also be achieved against such pressures. The clamp is easily assembled and disassembled by prying walls 12–13 to permit insertion of member 15, until pivots 18 become captive in the ramp-notch region, upon snap-closure of walls 12–13 against the shoulders or ends of the body of the compression drum. The body may have discrete compression surfaces 16–17, but I illustrate my preference for a smoothly faired interconnection 26 thereof. Also it is convenient to form stop projections 27 at the end of handle 19, to limit its downward position, upon engagement with a suitably slabbed off slope 28 of the upper edges of walls 12–13, thereby precisely defining the closed-shut condition and presenting simpler finger access for clamp release.

While the invention has been described in detail for the preferred form shown, it will be understood that modifications may be made without departure from the scope of the invention.

What is claimed is:

1. A flow-metering hose clamp, comprising a channel frame member comprising a bottom wall and two upstanding side walls, corresponding downwardly sloping ramps on said side walls and providing a range of offsets from said bottom wall as a function of longitudinal displacement along said bottom wall, and a compression drum member having an arcuate compression surface, said drum member extending between said walls and including projecting cylindrical pivot elements at each end, said compression surface including a portion that is generally cylindrical about the axis of said pivot elements and said drum member including an actuating arm extending in essentially a single direction and generally radially of the axis of the compression surface, said arm providing at least a limited range of rotary actuation of said drum member with respect to said frame member while said pivot elements ride said ramps and while said arcuate compression surface faces said bottom wall, whereby with a resilient hose interposed between said compression surface and said bottom wall an operation of said actuating means may cause small controlled incremental compressional displacement of said surface toward said bottom wall through rolling-contact engagement of said pivot elements with said ramps, and whereby with said arm extending in the general direction away from the downward slope of said ramps, such rolling-contact engagement inherently aids bodily displacement of said compression surface in the downward-slope direction as said arm is actuated toward the bottom wall.

2. A clamp according to claim 1, in which said compression surface extends generally arcuately about its axis at least for a range of substantially 45°, from a point of substantial tangency to a line parallel to the extending direction of said arm, and in the direction away from the extending direction of said arm.

3. A clamp according to claim 2, in which said arcuate extent is substantially one radian.

4. A clamp according to claim 1, in which said compression surface is one of two compression surfaces on said drum, the other compression surface being arcuate about an axis offset from the pivot-element axis.

5. A clamp according to claim 4, in which said side walls include pivot-element support means offset from said ramps and from said bottom wall to an extent exceeding the diameter of the generally circular contour which characterizes said other compression surface.

6. A clamp according to claim 5, in which said pivot-element support means is adjacent the ramp end of greatest offset from said bottom wall.

7. A clamp according to claim 6, in which each side wall has a single opening defining a ramp edge ending at a notch, wherein the notch provides said pivot-element support means and is of greater offset from said bottom wall than any part of the ramp edge.

8. A clamp according to claim 4, in which the radius of said pivot elements is about a half of the radius of said other compression surface.

9. A clamp according to claim 4, in which the radius of said one compression surface is about one half the radius of the other compression surface.

10. A clamp according to claim 9, in which the radius of said pivot elements is less than that of said one compression surface.

11. A clamp according to claim 1, in which the ramp slope with respect to the bottom wall is at least no greater than substantially 15°.

12. A clamp according to claim 11, in which the ramp slope is about 7°.

13. As an article of manufacture, a hose clamp having selective on-off and metering capability in application to a flexible tubing, comprising a single-piece molded-plastic channel-frame member and a single-piece molded-plastic compression drum member; said frame member comprising integral bottom and side walls, said side walls having corresponding integral pivot-engaging means providing a range of offsets from said bottom wall as a function of longitudinal displacement along said bottom wall; said compression drum member including two generally cylindrical arcuate surfaces on spaced parallel axes such that said arcuate surfaces are in angularly offset relation with respect to each other, an integral actuating arm extending generally transverse to a plane through the axes of said cylindrical surfaces, and integral cylindrical pivot projections at the ends of said drum member and engaged to said respective pivot-engaging means, said arcuate surfaces being at different effective radial offsets with respect to the axis of the pivot projections; one of said surfaces being of larger radius than the other, and the axis of said pivot projections being closer to the axis of said smaller radius than to the axis of said larger radius.

14. An article according to claim 13, in which the pivot projection radius is about one half the larger of the arcuate-surface radii.

15. An article according to claim 14, in which the axis of the smaller arcuate-surface radius is located close to the projected sectional area of said pivot projections.

16. An article according to claim 15, in which the axes of the smaller arcuate-surface radius and of said pivot projections are substantially coincident.

17. As an article of manufacture, a two-piece hose clamp having selective on-off and assembly-disassembly capability in application to flexible tubing, comprising a single-piece molded-plastic channel-frame member and a single-piece molded-plastic compression-drum member; said frame member comprising integral bottom and side walls defining an elongate channel, said side walls having corresponding integral pivot-engaging means providing a range of offsets from said bottom wall, said pivot-engaging means having opposed slot formations in each side wall and extending at least in part transverse to the elongation direction of said channel, the upper edge of each slot formation being continuous and elongate; and compression-drum member including a generally cylindrical arcuate compression surface, integral cylindrical pivot projections of radius less than the effective radius of said compression surface and at the ends of said drum member on a pivot axis parallel to and offset from the axis of the arcuate compression surface, said drum surface being of axial length substantially equal to the spacing of said side walls, and said pivot projections extending into said pivot-engaging means, said side walls being of such thickness for the material of said frame member as to be compliantly laterally yieldable to the extent of permitting transient deformation for ready assembly of said drum member to and disassembly thereof from said frame member after inserted application of flexible tubing into the channel of said frame member, and an integral actuating arm extending generally transverse to a plane through the axes of said cylindrical compression surface and of said pivot projections, whereby said arm provides the dual functions of (a) controlling the degree of clamp action on an inserted flexible tubing and (b) forcing the transient compliant outward deflection of said side walls to dislodge pivot projections from said pivot-engaging means.

18. An article according to claim 17, in which the channel bottom has a transverse groove facing in the direction of said pivot-engaging means and defining two pinching edges for flexible tubing compressed by actuation of said drum member.

19. A flow-metering hose clamp, comprising a channel frame member comprising a bottom wall and two upstanding side walls, corresponding downwardly sloping ramps on said side walls and providing a range of offsets from said bottom wall as a function of longitudinal displacement along said bottom wall, and a compression drum member having two arcuate compression surfaces, said drum member extending between said walls and including projecting cylindrical pivot elements at each end, one of said compression surfaces including a portion that is generally cylindrical about the axis of said pivot elements, the other compression surface being arcuate about an axis offset from the pivot-element axis, and said drum member including actuating means providing at least a limited range of rotary actuation of said drum member with respect to said frame member while said pivot elements ride said ramps and while said one arcuate compression surface faces said bottom wall, whereby with a resilient hose interposed between said one compression surface and said bottom wall an operation of said actuating means may cause small controlled incremental compressional displacement of said surface toward said bottom wall through rolling-contact engagement of said pivot elements with said ramps; said side walls including pivot-element support means offset from said ramps and from said bottom wall to an extent exceeding the diameter of the generally circular contour which characterizes said other compression surface, the inner surface of said bottom wall having a transversely extending recess extending between said side walls and local to the region of drum support when located in said pivot-element support means, said recess defining two transversely extending hose-pinching edges on opposite longitudinal sides of the plane normal to the channel bottom and through the pivot axis when located by said pivot-element support means.

* * * * *